(12) United States Patent
Sandford et al.

(10) Patent No.: US 7,890,394 B2
(45) Date of Patent: Feb. 15, 2011

(54) SECURE ACCESS TO TRANSACTION BASED INFORMATION

(75) Inventors: Gregory Sandford, Pleasanton, CA (US); Eric L. Solberg, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1507 days.

(21) Appl. No.: 10/778,734

(22) Filed: Feb. 13, 2004

(65) Prior Publication Data

US 2007/0179890 A1 Aug. 2, 2007

(51) Int. Cl.
*G06Q 40/00* (2006.01)
(52) U.S. Cl. ........................................ 705/35; 705/37
(58) Field of Classification Search ................ 705/35
See application file for complete search history.

(56) References Cited

U.S. PATENT DOCUMENTS

| 2005/0138110 | A1* | 6/2005 | Redlich et al. ............ 709/201 |
| 2007/0226027 | A1* | 9/2007 | Chang et al. ................ 705/8 |
| 2008/0133415 | A1* | 6/2008 | Ginter et al. ............... 705/50 |

\* cited by examiner

*Primary Examiner*—Ella Colbert
*Assistant Examiner*—John A Anderson
(74) *Attorney, Agent, or Firm*—Kilpatrick Townsend & Stockton LLP

(57) ABSTRACT

The present invention includes a system and method for securing information and accessing secured information. In accordance with an embodiment of the present invention, information is secured by associating a context in which the information was generated, for example. To access the secured information, a user provides a point in time and a user identifier, which are used to determine whether that user is authorized to access the information.

28 Claims, 11 Drawing Sheets

|     | \multicolumn{6}{c|}{Attributes} |
| Key | Node | Participant | Plan ID | Node Security | Time Period | |
| --- | --- | --- | --- | --- | --- | --- |
| 123 | C | Charlie | #50 | Y | Y | t=JAN 1 | t=P |
| ABC | F | Marc | #550 | N | N | t=JAN 1 | t=P |
| KLM | F | Sue | #200 | N | N | t=JAN 1 | t=P |
| TUV | D | Sam | #150 | N | N | t=JAN 1 | t=P |

FIG. 4

|      | | Attributes | | | | | |
| --- | --- | --- | --- | --- | --- | --- | --- |
| Key | Node | Participant | Plan ID | Node Security | | Time Period | |
| 123 | C | Charlie | #50 | Y | Y | t=JAN 1 | t=JAN 31 |
| ABC | F | Marc | #550 | N | N | t=JAN 1 | t=P |
| KLM | F | Sue | #200 | N | N | t=JAN 1 | t=P |
| TUV | D | Sam | #150 | N | N | t=JAN 1 | t=P |
| ... | | | | | | | |
| 456 | B | Charlie | #60 | Y | Y | t=FEB 1 | t=P |
|  | 404 | 406 | 408 | 410 | 412 | 414 | 416 |

450 { (rows 123, ABC, KLM, TUV)
558 { (row 456)
402 (Key column)
500 (table)

FIG. 5

| User ID | Begin Date | End/Present Date | MGR_CTX | Sub_CTX |
|---|---|---|---|---|
| Charlie_ID | t = JAN 1 | t = JAN 31 | 123 | ABC, KLM |
| Charlie_ID | t = FEB 1 | t = P | 456 | TUV |

FIG. 6

| Key | Attributes | | | | | |
|---|---|---|---|---|---|---|
| | Node | Participant | Plan ID | Node Security | Time Period | |
| 450⟩ 123 | C | Charlie | #50 | Y | Y | t=JAN 1 | t=P |
| 452⟩ ABC | F | Marc | #550 | N | N | t=JAN 1 | t=P |
| 454⟩ KLM | F | Sue | #200 | N | N | t=JAN 1 | t=P |
| 456⟩ TUV | D | Sam | #150 | N | N | t=JAN 1 | t=P |
| 960⟩ 789 | B | Nancy | #51 | Y | Y | t=JAN 1 | t=P |
| 962⟩ WXY | F | Sam | #151 | N | N | t=JAN 1 | t=P |
| 402 | 404 | 406 | 408 | 410 | 412 | 414 | 416 |

Context Table

| Key | Attributes | | | | | |
|---|---|---|---|---|---|---|
| | Node | Participant | Plan ID | Node Security | Time Period | |
| 123 | C | Charlie | #50 | Y | t=JAN 1 | t=JAN 31 |
| ABC | F | Marc | #550 | N | t=JAN 1 | t=P |
| KLM | F | Sue | #200 | N | t=JAN 1 | t=P |
| TUV | D | Sam | #150 | N | t=JAN 1 | t=P |
| 789 | B | Nancy | #51 | Y | t=JAN 1 | t=JAN 31 |
| WXY | F | Sam | #151 | N | t=JAN 1 | t=P |
| 456 | B | Charlie | #51 | Y | t=FEB 1 | t=P |
| 012 | A | Nancy | #9 | Y | t=FEB 1 | t=P |
| 345 | C | Sid | #50 | Y | t=FEB 1 | t=P |
| 402 | 404 | 406 | 408 | 410 | 412 | 414 416 |

SECURE ACCESS TO TRANSACTION BASED INFORMATION

CROSS-REFERENCE TO RELATED APPLICATIONS

This application is related to U.S. patent application Ser. No. 10/426,474, entitled "Hierarchical Transaction Filtering" and filed on Apr. 29, 2003. This application is incorporated by reference herein in its entirety for all purposes.

BACKGROUND

1. Field of the Invention

The present invention relates generally to securing information in computing systems, and more specifically to limiting access to that information based on the context in which at least a portion of the transactional information was generated, such as from a sale.

2. Background

Securing information has become a priority for organizations to ensure that business processes and information relating thereto remain confidential. As an organization's business processes becomes more complex, the means for securing information has to be flexible to adapt to organizational changes while preserving an appropriate balance between confidentiality (i.e., limiting access to information) and openness (i.e., freedom to access information), both of which are necessary for the success of the organization. Examples of organizational changes requiring such flexibility include employee/group transfers, company reorganizations, compensation plan adjustments and the hiring and/or terminating of personnel.

To manage compensation schemes through these types of organizational changes, as well as providing incentive-based compensation for employees in general, organizations have structured compensation plans in accordance with Enterprise Incentive Management (EIM) principles. These principles tailor compensation plans so as to improve optimal performance and to align the organization's strategy with the desired behaviors of it employees. EIM refers generally to managing variable pay plans throughout an organization (i.e., corporation or enterprise) and includes plans for salespeople, suppliers, distribution channel partners, brokers, customers, employees, executives, and partners.

But conventional approaches to securing information generated in the framework of an organization typically lack the flexibility to adapt to changes in corporate processes or structure, such as a change in traditional compensation schemes or personnel. For example, consider a personnel change from one part of an organization to another part as shown in FIG. 1.

FIG. 1 depicts a traditional organizational chart illustrating an employee transferring from one position in organizational structure 100 to another position in new organizational structure 110. Organizational structures 100 and 110 each represent a hierarchical structure depicting supervisor-subordinate relationships where permissions to access secured information decreases from the top position occupied by "A" to the bottom positions occupied by "D," "E," and "F." A square box in FIG. 1, such as the one labeled A, represents a position or role occupied by an employee (or a group/organizational element) and is interrelated with other square boxes, where the interrelations are depicted as lines connecting at least two square boxes. Hence, an employee or organizational element occupying box A is in a supervisory role to employees or organizational elements in boxes "B" and "Cynthia," which are both in subordinate roles to that of box A.

In organizational structure 100, Cynthia is shown to occupy a supervisory role in relation to boxes E and F, which can be employees, groups of employees or other organizational elements. In this role, Cynthia has a "span of access" 102 and is granted permission to access information relating at least to her subordinates occupying boxes E and F, which may include transactional information forming Cynthia's compensation.

Further, consider that an employee associated with box E is a sales person operating according to a compensation plan that specifies each of the following allocations to their supervisor Cynthia's compensation: 2% of sales revenue within a particular geographic region; 1% of sales from a particular product line; 2% of sales to a particular customer; and 0.5% of sales by other members of her sales team. Since Cynthia's compensation is based upon such a compensation scheme, she and others in her position are traditionally authorized to access transactional information in her span of access 102 to verify that the sales person's sales revenues are accurately recorded. In particular, Cynthia can access transactional information for boxes E and F but not boxes B and D, which are outside of her span of access 102.

Next, consider that Cynthia assumes a new role in new organizational structure 110 in the position formerly demarcated as box B of organization structure 100. In this role, traditional security mechanisms allow Cynthia to now have access to transactional information within span of access 112, which authorizes her to examine the activities of the employee(s) relating to box D to review the transactional information that affects her compensation in this new role. But once Cynthia assumes this new role in organizational structure 110, she traditionally is precluded from having access to transactional information for span of access 102. This is generally due to traditional approaches to securing information where a person's set of permissions are dependent on the person's current position in an organization. Without having span of access 102, Cynthia is unable to determine whether her previous efforts and those of her previous subordinates are adequately and accurately recognized so that she can justly be compensated for any activity occurring before she assumed her new role in organization structure 110. Thus, there is a need to provide a flexible method of securing information such that the aforementioned drawbacks of conventional EIM schemes are overcome.

SUMMARY OF THE INVENTION

Embodiments of the invention include a method and a system for securing information, such as information generated from a transaction. In one embodiment, an exemplary method for securing information to a computing system is disclosed. The method comprises identifying a first entity associated with data representing at least a portion of transactional information, identifying a second entity having a relationship to the first entity, determining a subset of the data generated during the relationship, and authorizing access to the subset of data at a point in time other than during the relationship.

In another embodiment, a method for accessing a secured computer system by a user is also disclosed. The method comprises accepting via a user interface at least one input signal representing a user identifier associated with the user, accepting via a user interface at least another input signal representing a point in time, identifying one or more subsets of data associated with both the point in time and the user identifier, each subset of data representing at least a portion of transactional information, and providing to the user the one or more subsets of data at another point in time unrelated to the one or more subsets.

Various embodiments of the invention include a method for securing information within a computing system, the method comprising identifying a first entity associated with data representing at least a portion of transactional information, identifying a second entity having a relationship to the first entity, determining a subset of the data generated during the relationship, and authorizing access to the subset of data at a point in time other than during the relationship.

Various embodiments of the invention include a method for accessing a secured computer system by a user, the method comprising accepting via a user interface at least one input signal representing a user identifier associated with the user, accepting via a user interface at least another input signal representing a point in time, identifying one or more subsets of data associated with both the point in time and the user identifier, each subset of data representing at least a portion of transactional information, and providing to the user the one or more subsets of data at another point in time unrelated to the one or more subsets.

Various embodiments of the invention include a system for securing information comprising means for identifying a first entity associated with data representing at least a portion of transactional information, means for identifying a second entity having a relationship to the first entity, means for determining a subset of the data generated during the relationship, and means for authorizing access to the subset of data at a point in time other than during the relationship.

Various embodiments of the invention include an apparatus for securing information comprising a server system configured for identifying a first entity associated with data representing at least a portion of transactional information, the server system further configured for identifying a second entity having a relationship to the first entity, the server system further configured for determining a subset of the data generated during the relationship, and the server system further configured for authorizing access to the subset of data at a point in time other than during the relationship.

Various embodiments of the invention include a computer readable medium containing programming code implementing a method for securing information within a computing system, the method comprising identifying a first entity associated with data representing at least a portion of transactional information, identifying a second entity having a relationship to the first entity, determining a subset of the data generated during the relationship, and authorizing access to the subset of data at a point in time other than during the relationship.

Various embodiments of the invention include a computer readable medium containing programming code implementing a method for accessing a secured computer system by a user, the method comprising accepting via a user interface at least one input signal representing a user identifier associated with the user, accepting via a user interface at least another input signal representing a point in time, identifying one or more subsets of data associated with both the point in time and the user identifier, each subset of data representing at least a portion of transactional information, and providing to the user the one or more subsets of data at another point in time unrelated to the one or more subsets.

BRIEF DESCRIPTION OF THE DRAWINGS

FIG. 4 illustrates an exemplary context table for an organizational structure of FIG. 2, according to various embodiments of the present invention;

FIG. 5 illustrates an exemplary context table for another organizational structure of FIG. 2, according to various embodiments of the present invention;

FIG. 6 illustrates an exemplary security table, according to various embodiments of the present invention;

FIG. 9 illustrates an exemplary context table for an organizational structure of FIG. 8, according to various embodiments of the present invention;

FIG. 10 illustrates an exemplary context table for another organizational structure of FIG. 8, according to various embodiments of the present invention.

DESCRIPTION OF THE SPECIFIC EMBODIMENTS

Detailed descriptions of the exemplary embodiments are provided herein. The present invention can be embodied in various forms, as one having ordinary skill in the art would recognize. Therefore, specific details disclosed herein are not to be interpreted as limiting, but rather as a basis for the claims and as a representative basis for teaching an ordinarily skilled artisan to employ the present invention in virtually any appropriately detailed system, structure or manner.

Figure 1:
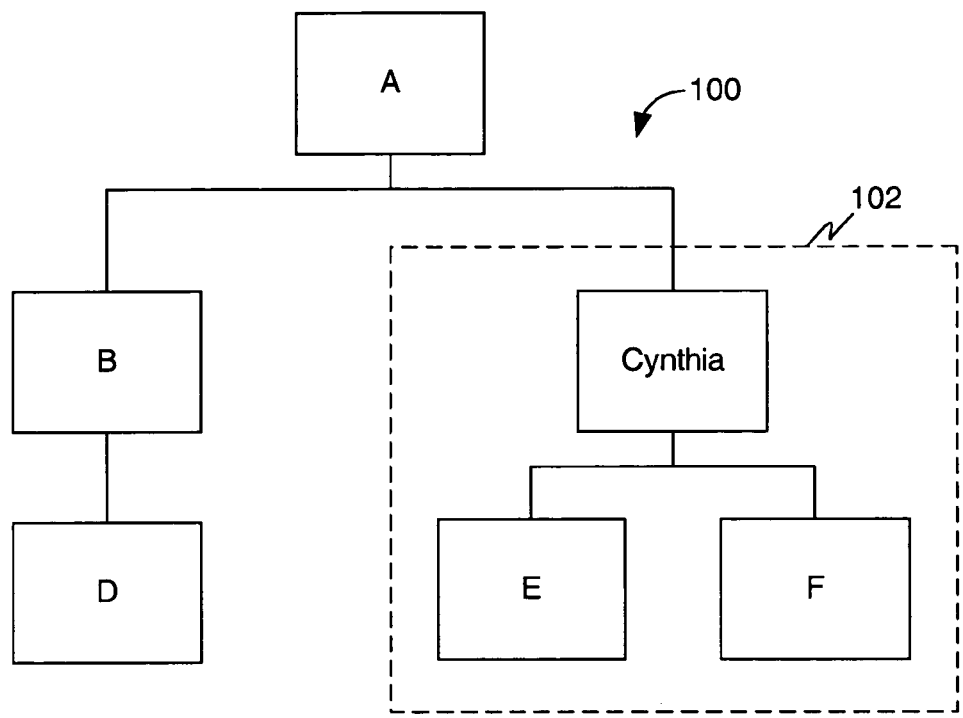
FIG. 1 is an organizational chart depicting a span of access to subordinate information changing as a function of a change in the organizational structure, the span of access determined by conventional security mechanisms.
Figure 1:
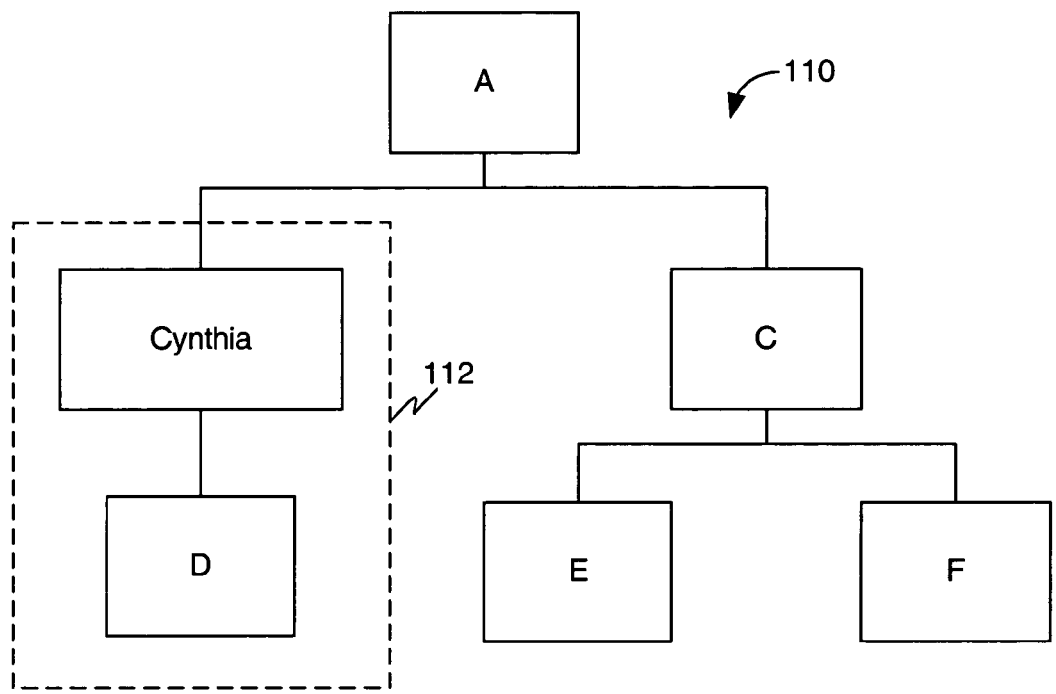
Figure 2:
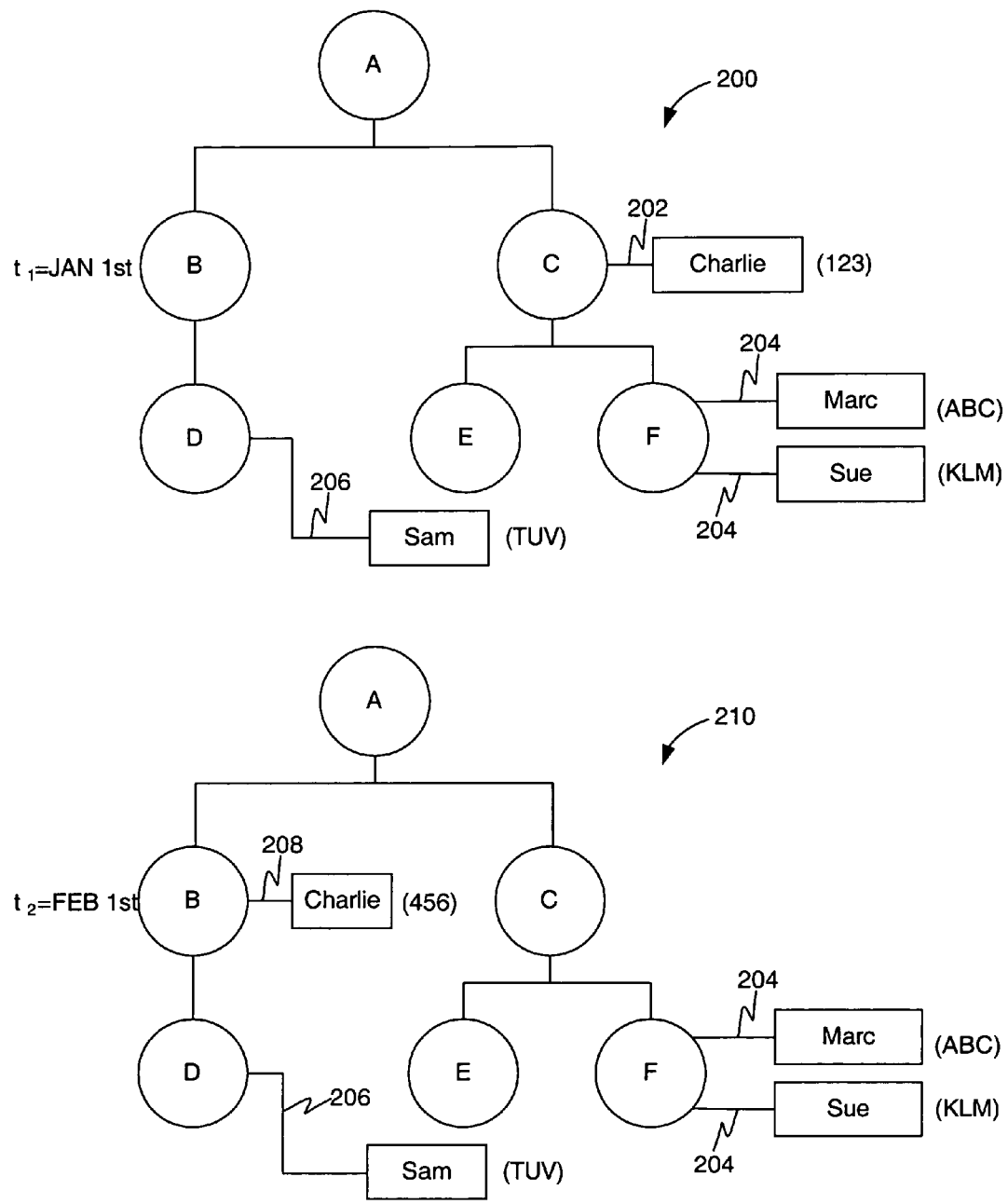
FIG. 2 depicts an exemplary hierarchical tree data structure at two periods of time in accordance with at least one specific embodiment of the invention.

A system and method in accordance with an embodiment of the present invention employs a hierarchical data structure, such as a tree data structure that contains nodes, referred to as "parent," "child," and/or "sibling," and interrelationships between those types of nodes. FIG. 2 illustrates an exemplary hierarchical data structure for representing organization structure 200, where node A is a parent node for nodes B, C, D, E and F. Nodes B and C are child nodes to node A and are sibling nodes with respect to each other, since they share the same, lower level (and are a generation removed from node A). Similarly, node D is a child node of node B and nodes E and F are child nodes of node C, and are also sibling nodes with respect to each other.

Further to this example, the parent-child relationship between nodes B and D and among nodes C, E and F represent supervisor-subordinate relationships. Hence, a person associated with node C, for example, is in a supervisory role in regards to persons associated with nodes E and F, which are in subordinate roles with respect to node C. According to a specific embodiment of the present invention, a person in a supervisory role, which typically is associated with a particular parent node, is granted permission to access information (e.g., transactional information) relating to either one or more subordinates (associated with one or more child nodes), one or more other supervisors (associated with the same node), or both. In particular, as a person is associated with higher-level nodes, that person typically will have access to an increasing number of subordinates' information. In accordance with another embodiment of the present invention, exemplary organization structure 200 represents but just a portion of a larger hierarchical structure. Hence node A is not limited to being a root node, but rather could be a child node of another node not shown. Similarly, nodes D, E, and F can be parent nodes of other nodes also not shown. One having ordinary skill in the art will recognize that organization structures 200 (and 210) can be implemented using known data and database management techniques.

Although organization structure 200 of FIG. 2 is described in terms of supervisor-subordinate relationships, organization structure 200 can suitably represent hierarchical relationships among products, geographic territories, compensation allocation plans that describe how transaction proceeds are allocated and to whom (as will be exemplified in a following example), or any other types of relationships that an organization selects to relate data. As described herein, a "transaction" can be any communicative action or activity involving two parties or organization elements that reciprocally affect or influence each other. For example, a transaction can result from any business process, such as a sale, an employee evaluation, etc. "Transactional information" therefore can include any information regarding a particular transaction. If the transaction is a sale, then transactional information relating to that sale can include a specific sales territory (e.g., geographic location), a specific product type, a sales team, an individual salesperson, a channel partner, a price range, a payment schedule, etc.

Referring again to FIG. 2, consider another example where organizational structure 200 represents a hierarchy of relationships for allocating compensating credit (e.g., proceeds from a sale) where association 202 represents that sales manager "Charlie" is associated or positioned at node C of organizational structure 200. In this instance, Charlie manages at least two teams of sales personnel, where associations to node E (none shown) represent one sales team and associations 204 to node F represent another sales team, which team includes sales person "Marc" and "Sue." Also shown is association 206, which associates or relates sales person "Sam" with node D. Sam, however, is not part of Charlie's sales teams during a first point in time JAN $1^{st}$ (January $1^{st}$), which is related to a time period of one month (i.e., January), for example.

Also shown in FIG. 2 with respect to organizational structure 200 are alpha-numeric identifiers ("keys"), such as "(123)," "(ABC)," etc. As is discussed below, these alpha-numeric identifiers are keys for describing a unique "context" in which each member of organizational structure 200 operates. In accordance with a specific embodiment of the present invention, a context facilitates retaining permissions to access information that one once was authorized to access, regardless of change in organization structure 200. Other identifier formats suitable for application as a key are also within the scope and spirit of the present invention. For example, a key can consist of only numbers (e.g., "123569"), only letters (e.g., "adgeid"), or any combination of numbers and/or letters and can include any other symbol(s) or key structure, format or type.

New organization structure 210 of FIG. 2 illustrates a modified organization structure at a second point in time FEB. $1^{st}$ (February 1st), which is related to another time period of one month (i.e., February). In this example, sales manager Charlie has been transferred to another, lateral position (e.g., in another region, in another product line, or in any other capacity). In organizational structure 210, association 208 relates Charlie to node B, which is a parent node of node D. Therefore, Charlie is now supervising Sam, which inherently authorizes Charlie to review transaction information relating to any transaction in which Sam engages or executes during this relationship.

Figure 3:
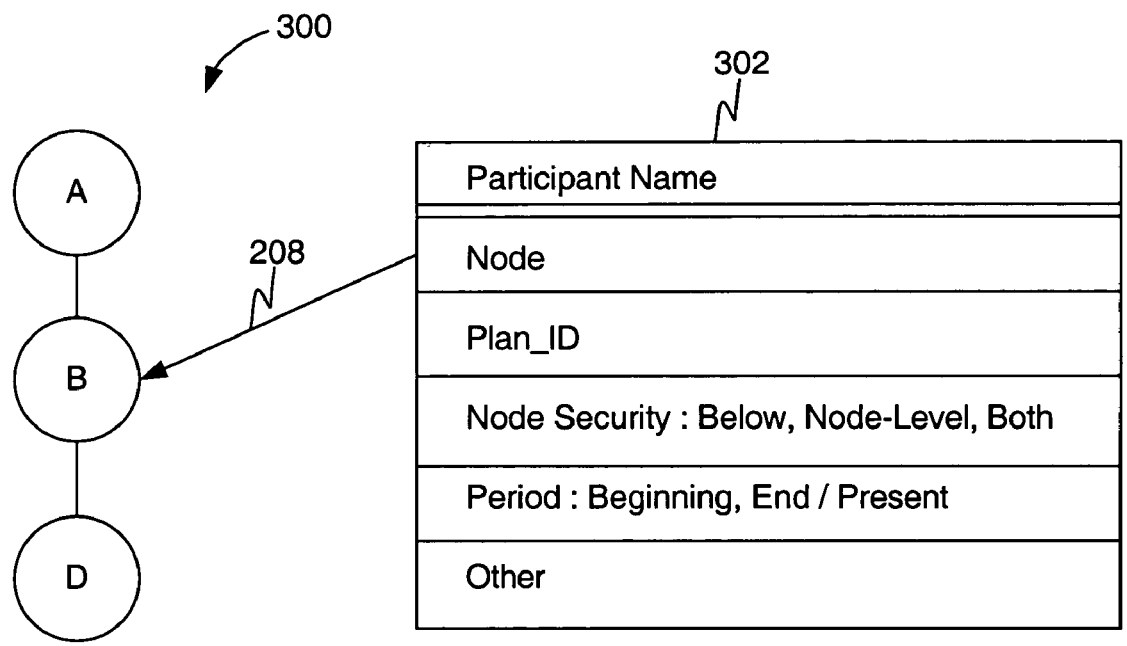
FIG. 3 shows exemplary associations to a node of a portion of a hierarchical tree data structure, the associations exemplified as an object in accordance with a specific embodiment of the present invention.
Figure 7:
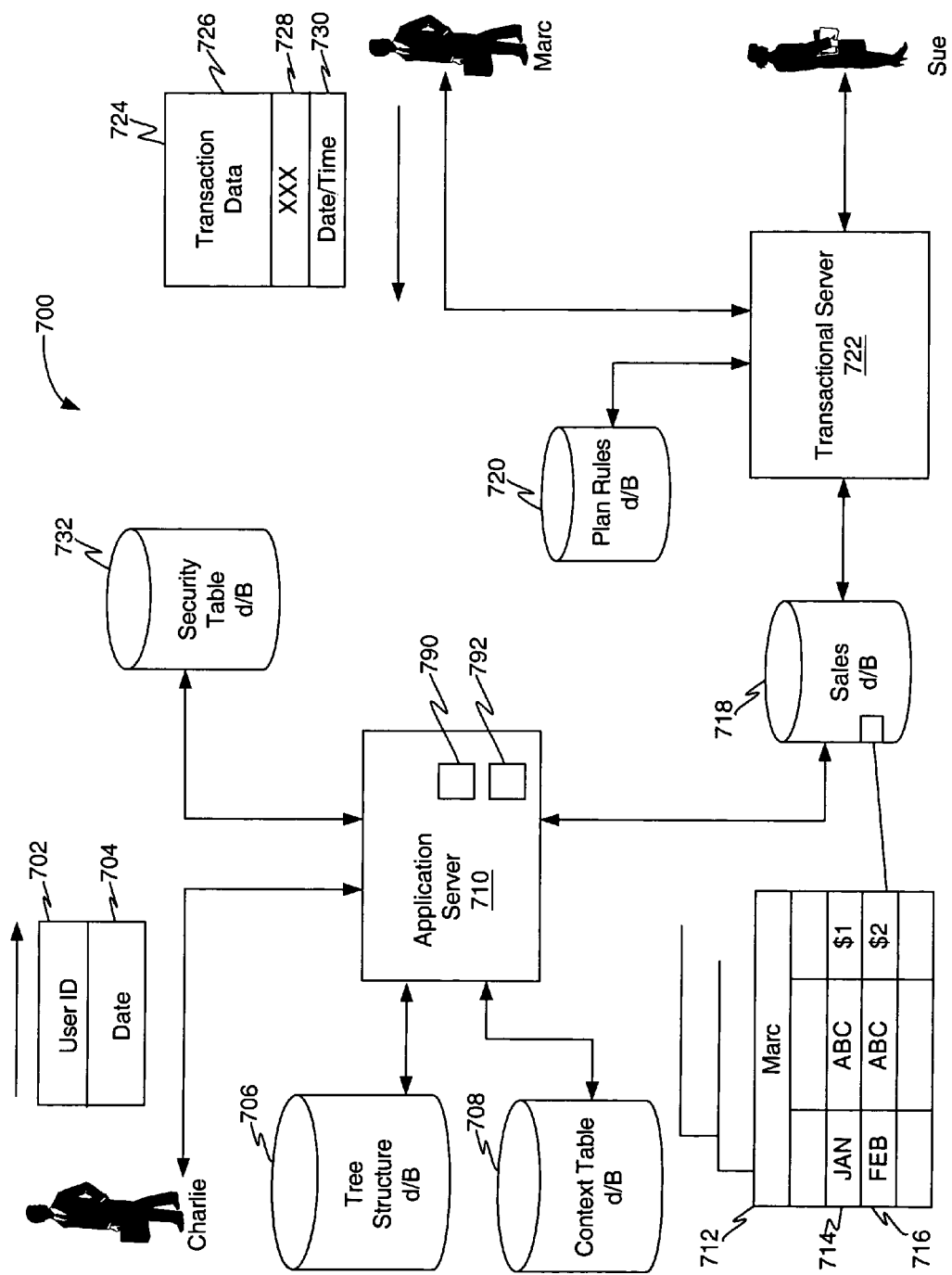
FIG. 7 illustrates an exemplary system for securing access to information in accordance with a specific embodiment of the present invention.

FIG. 3 illustrates portion 300 of organization structure 210 of FIG. 2 and an example of the types of attributes 302 used to generate association 208 for associating or linking Charlie to node B. In one embodiment, an administrator provides one or more of such attributes to a computing device for generating both association 208 and a corresponding key to identify Charlie's new context. Exemplary context engine 790 of FIG. 7 is configured to at least receive the attributes, generate a key, if necessary, and then inject the resultant key and attributes into a context table, such as exemplary context table 400 of FIG. 4. In some embodiments, a computing device (e.g., an application server) operates to automatically input one or more of the attributes.

Referring back to FIG. 3, each of the attributes "participant name," "node," "plan ID," "node security," "period," and "other," according to a specific embodiment, can be represented collectively as an object in an object-oriented program embodying an exemplary method of the present invention. The participant name attribute describes a person's name, such as "Charlie." The node attribute describes the position of a member or an entity on the hierarchical data structure of an organization. In some exemplary embodiments, the node inherently ascribes a role to that member or entity. For example, by associating Charlie with node B, he can also be associated with a "supervisory role," which imputes permissions commensurate with his title (e.g., ability to access subordinate information) or the association between Charlie and node B.

The plan ID attribute assigns one or more compensation plans to the node, and in this instance, to Charlie. A compensation plan typically includes a set of rules that defines how to allocate to one or more persons (e.g., Charlie) credit or proceeds resulting from a transaction, such as a sale. A plan ID can be represented by a number (or by any other type of identification means), such a plan ID #50. As an example, plan ID #50 allocates 2.4% of sales revenue generated by Sam within a particular geographic region, 2% of sales generated by Sam from a particular product family, and 2% of sales generated by Sam from a particular customer, all of which allocate those amounts to Charlie.

The node security attribute can be used to grant permission to access transactional information at either children nodes or the current node, or both. The period attribute describes the beginning of a time period, where the period can be monthly, quarterly, every 30 days, or any duration defined by the organization. The period attribute also describes whether association 208 of FIG. 3 is valid (i.e., "present" is selected; the relationship continues) or terminated (i.e., "end" is selected; the relationship is severed). In an exemplary embodiment, if context engine 790 of FIG. 7 detects that there are no changes to an association between a node and person, then the context engine 790 sets the period attribute as "present" denoting that that association remains valid. Lastly, the "other" attribute can be any other type of attribute that an ordinarily skilled artisan would include to practice the present invention.

Referring back to FIG. 2, organization structure 210 shows that Charlie is associated with a new key "456" for identifying his new context. Both the 123 key and the new key 456 facilitate effective dated security access in accordance with various embodiments of the present invention. That is, key 456 allows Charlie to access Sam's information at least during the month of February, whereas key 123 allows Charlie to access information belonging to either Marc or Sue during the month of January, even though Charlie is no longer in a supervisory role associated with node C. Key 123 is valid for only the period(s) of time that Charlie was authorized access to his subordinates' information. Therefore, Charlie cannot access information belonging to either Marc or Sue that was generated any time after Charlie left his position associated with node C and identified by key 123. FIGS. 2 and 4-7 and the related discussion describes a specific embodiment for providing effective dated security in accordance with the present invention using one or more contexts.

FIG. 4 depicts an exemplary context table 400 as but one suitable data structure for organizing and storing attribution information constituting at least one particular context, according to one embodiment of the present invention. Context engine 790 of FIG. 7 functions to evaluate attributes related to a specific node (or some other criterion) to at least determine that for that specific node, no updates are required. If no updates are required, then the contents of the context table would remain as shown in FIG. 4. Context table 400 includes the contexts of each of the members of organizational structure 200 of FIG. 2. Context table 400 includes key fields 402, as generated by context engine 790 of FIG. 7, node fields 404, participant name fields 406, plan ID fields 408, "node security permissions to access current node" fields 410, "node security permissions to access child node" fields 412, beginnings of time period fields 414 and endings of time period fields 416. One having ordinary skill in the art will recognize that context table 400 as well as context table 500 of FIG. 5 and security table 600 can be implemented using known data and database management techniques.

Records 450, 452, 454 and 456 include attributes associated with Charlie, Marc, Sue, and Sam, respectively. As shown, record 450 indicates that participant attribute in field 406 is Charlie, and that Charlie is allocated compensation in accordance to at least plan ID attribute "#50," which is in field 408. Additional attributes constituting the context for Charlie include the position at which Charlie is located on the organization structure 200 of FIG. 2. Here, node attribute 404 of FIG. 4 for record 450 is shown as node C. Moreover, record 450 indicates that Charlie is authorized to access information relating to and/or generated by persons at both their nodes and child nodes (of their nodes). Such an authorization is granted because "node security permission to access current node" field 410 is indicated as "Y" for yes, and "node security permission to access child nodes" field 412 is also indication as "Y" for yes (contrary to "N" for no). These two attributes will discussed further in relation to other embodiments of the present invention.

Record 450 also shows that Charlie's context attribute information is valid from beginning of the period field 414, which is shown as JAN $1^{st}$, through to end/present date field 416 of "P," where P indicates that Charlie's association to node C continues in the present, and thus still exists (i.e., his context remains valid). Lastly, key field 402 of record 450 includes "123," which uniquely identifies Charlie's context in organizational structure 200 of FIG. 2. Although FIG. 4 shows only four records 450, 452, 454 and 456, context table 400 can be configured to include many more records describing contexts for an entire organization, for example.

FIG. 5 shows context table 500 (revised context table 400 of FIG. 4), which includes a new record 558 to specify Charlie's new position (and context) after Charlie's transfer into a position associated with node B of organizational structure 210. For at least the reason that node attribute 404 for Charlie now includes node B, context engine 790 of FIG. 7 evaluates other records in the context table to determine whether there is a match. If no other record contains each of the attributes, then context engine 790 generates a new context, and thus new key "456," which is placed in key field 402 of record 558 of FIG. 5. Since Charlie is now in a supervisory role over sales person Sam, Charlie is assigned a new compensation plan identifier #60, which is placed in plan ID field 408. Lastly, assuming that February $1^{st}$ is the effective date of Charlie's transfer to this new position, context engine 790 of FIG. 7 in this instance sets both beginning of time period field 414 of record 558 to FEB $1^{st}$ and ending of time period field 416 of record 558 to P (for presently valid). Also, the context engine 790 closes the validity of Charlie's original context (i.e., key 123) by setting ending of time period field 416 of record 450 to JAN $31^{st}$. Therefore, Charlie's context identified by key 123 will allow Charlie to access information relating to his node and child nodes of his node for Node C only if that information was generated during the January time period.

Figure 6:
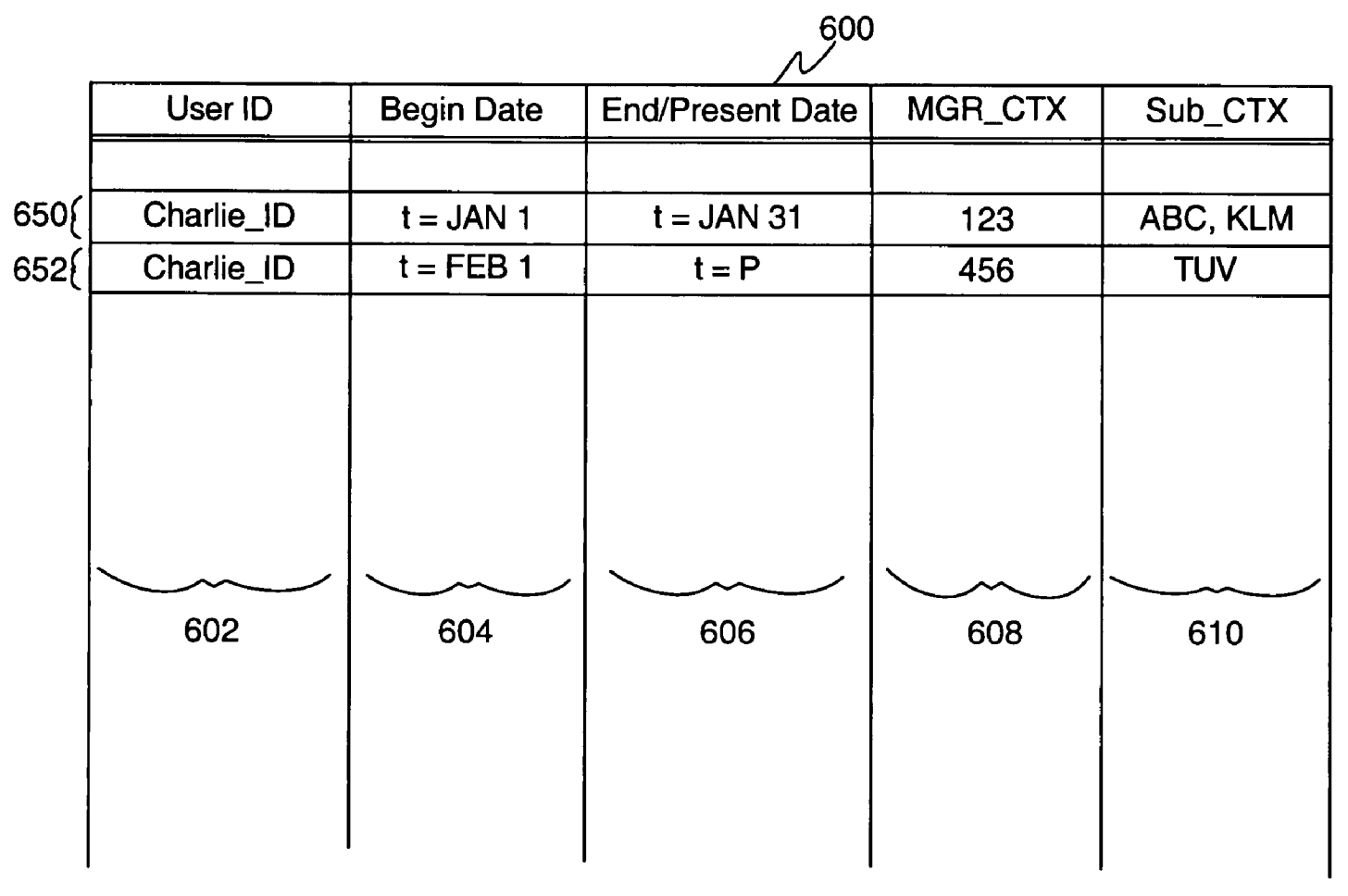

FIG. 6 depicts an exemplary security table 600 generated by security engine 792 of FIG. 7, according to a specific embodiment of the present invention. Security table 600 is but one example of a suitable data structure for organizing, storing and selecting keys based upon at least a user identifier ("ID") and a time period defined by a begin and an end/present date. As is discussed herein, one or more selected keys define a user's set of permissions to access information relating to the selected keys.

Security engine 792 of FIG. 7 functions to evaluate whether a new context is associated with a specific node (related to Charlie, for example). If there is a new context, such as the context identified by key 456 of FIG. 5, when security engine 792 is run to update an organization's security definitions, then the security engine will generate a new record, such as record 652 of FIG. 6. Otherwise, if security engine 792 discovers no new context, then security table 600 will not need to be updated.

Security table 600 includes the contexts of each of the members of an organizational structure that have permissions to inspect subordinate transactional information. Exemplary security table 600 includes user ID fields 402, begin date fields 604 of a time period and an end/present date fields 606 of the same time period, manager context ("MGR_CTX") fields 608 as generated by context engine 790 of FIG. 7, and subordinate context ("SUB_CTX") fields 610.

When a member of an organization wishes to access information of a subordinate included within an organization's computing system, for example, the member (or his/her designate) is considered a "user" of the computing system. In accordance with one embodiment, the user inputs a user ID that uniquely identifies that person within the computing system, such as "Charlie_ID" from user ID field 602. The user also will input (or the system will default to) a point in time (associated with a period of time), or a period of time itself, as defined by a begin date and an end/present date in fields 604 and 606, respectively. This time-related input identifies the context of the user in which the user seeks information. For example, if Charlie seeks information in January and enters a January date, his context during that time was "123" as indicated in manager context field 608. For this time period, his context 123 is associated with Marc's context ABC and Sue's context KLM as shown in subordinate context field 610 and with reference to FIG. 2. Thus, the user's context as indicated in manager context field 608 of security table 600 determines the associated contexts of his subordinates in which they either generated or processed transaction information. Therefore, any transactional information associated with a subordinate context, such as ABC or KLM, are available to Charlie to access in this example.

Although FIG. 6 shows only two records 650 and 652, security table 600 can be configured to include many more records describing security definitions for a number of members of an entire organization, for example. As described herein, a "security definition" is an organization member's set of permissions to access information. Because records 650 and 652 define Charlie's set of permissions, collectively these records are referred to herein as Charlie's "security definition."

In accordance with an exemplary method of the present invention, security table 600 is used to restrict access by users to those authorizations that they have or had during periods of time in which the users were in certain roles or positions in a hierarchical data structure. The following discussion of FIG. 7 will describe how security table 600, as well as context tables 400 and 500 of FIGS. 4 and 5, respectively, are used to secure access as well as to provide access to an organization's information.

FIG. 7 is an exemplary computing system 700 for securing information and for accessing secured information in accordance with a specific embodiment of the present invention. FIG. 7 shows system 700 including separate databases for organizing, storing and providing data relating to a hierarchical tree data structure, context table(s), and security table(s). Tree structure database ("d/B") 706 is configured to store at least information regarding nodes and interrelations therebetween to construct a tree such as organizational structures 200 or 210 of FIG. 2. Context table database 708 is configured to store at least information including attributes and keys to construct a data structure such as context tables 400 of FIG. 4 and/or 500 of FIG. 5. Security table database 732 is configured to store at least information including manager context keys and subordinate context keys to construct a data structure such as in security table 600 of FIG. 6.

Sales database 718 is configured to store transactional information, such as generated sales revenue, in relation to each member of the organization in a sales person role. For example, sales database 718 is shown in FIG. 7 to include an exemplary data structure 712 for organizing Marc's generated sales revenue for his context "ABC" and two time periods "t0-t1" and "t1-tP" in records 714 and 716, respectively. "Generated sales revenue" is information that constitutes at least a portion of the transactional information generated or processed by Marc. Plan rules database 720 is configured to store allocation rules that determine, in part, how to allocate revenues to certain recipients, such as Charlie. For example, Charlie's compensation may be determined in part based upon the sales revenues generated by Marc. In accordance with one embodiment of the present invention, the allocation rules and methods of allocating proceeds are performed in accordance with the methods disclosed in U.S. patent application titled "Hierarchical Transaction Filtering" filed on Apr. 29, 2003, and having application Ser. No. 10/426,474. This application is incorporated by reference herein in its entirety for all purposes.

FIG. 7 shows that system 700 also includes application server 710 and transactional server 722. Application server 710 includes context engine 790 and security engine 792 for generating and managing context table 400 of FIG. 4 and/or context table 500 of FIG. 5, and security table of FIG. 600, respectively. Suitable context and security engines that can be adapted to practice some embodiments of the present invention are included in a product named PeopleSoft EIM, such as version 8.8 or earlier, manufactured by PeopleSoft, Inc., of Pleasanton, Calif. Application server 710 includes additional logic (i.e., software, hardware, or a combination thereof) to generate a user interface to one or more users, to manage the implementation of the hierarchical data structure, the context table, the security table, and to provide the user's requested information in accordance with that user's security definition. In some embodiments, application server 710 is configured to include one or more SQL ("Structured Query Language") scripts for communicating with the databases 707, 708, and 732.

Transactional server 722 includes logic to receive transactional data (e.g., in a digital form) representing transactional information. In some embodiments, transactional server 722 monitors a member or an organization entity processing a transaction, such as a sale, and associates a sales person's context and the date to information describing such a transaction. Although the various databases and servers are shown as separate elements, one ordinarily skilled in the art would recognize that the databases can be incorporated into one or any number of databases and may be co-located or physically separate. Similarly, the two servers can be incorporated into one server or computing device or any number of computing devices. Further, the functionality associated with any of the elements shown in FIG. 7 can be distributed over any known communications network, such as the Internet, a local area network ("LAN"), or the like.

To illustrate securing information in accordance with a specific embodiment, consider the following scenario. Both Marc and Sue of FIG. 7 have contexts ABC and KLM, respectively, and are associated with node F of organization structure 200 of FIG. 2. As Marc completes a sale, transactional information related to the sale are communicated to transactional server 722 of FIG. 7 as file 724, which includes transaction data 726. In one embodiment, a client computer executing a distributed agent process appends Marc's context 728 and time and/or date 730 when transaction data 726 is generated as file 724. Time and/or date 730 need not be restricted to the point in time that the transaction data 726 is generated, but can be any reference relating to time, for example a predicted date that a transaction will be complete.

Transaction server 722 functions, in part, to aggregate transaction files 724 generated by Marc and Sue into an appropriate data structure, such as data structure 712. After transaction server 722 formats the transaction information, the information is stored in sales database 718. In this example, as Marc handles transactions and generates transactional information during the month of January, this information is stored in sales database 718. For example, Marc's sales revenues generated in January are stored collectively in data structure 712 as "$1" in record 714. Since these revenues relate to January, they are stored in record 714 and are associated with a period of time demarcated as "JAN." Lastly, in record 714 the context in which Marc generates transaction data 726 is associated with key ABC. But during the month February, any sales revenues generated by Marc are indicated collectively as "$2" in record 716. Since these revenues were generated in February, they are associated both by a period identifier "FEB" and Marc's context key ABC. Thus, Marc's supervisor, Charlie, will be required to have a security definition that allows Charlie to access records 714 or 716 for retrieving transactional information, such as the sales revenues in either January or February.

To illustrate accessing secured information in accordance with a specific embodiment, consider that Charlie wishes to view Marc's sales revenue for the month of January. In this month, Charlie is in a position associated with node C of organizational structure 200. In a specific embodiment, Charlie inputs CHARLIE_ID as a user ID 702 of FIG. 7, which identifies him as the user of a secured computing system containing the desired transactional information. Charlie also inputs a point in time 704, such as a date, into an appropriate user interface, such as a command line, a graphical user interface, or any other known user interface. Application server 710 then accesses security database 732 of FIG. 7 to retrieve data stored in security table 600 of FIG. 6. Because Charlie is associated with context key 123 during the month of January, he is permitted access to information related to subordinate context keys ABC and KLM. Therefore, Application server 710 will retrieve and present to Charlie Marc's sales revenues $1 for the month of January, if Charlie so requests.

But consider that during the month of February, Charlie requests to access Marc's transaction information. Charlie, however, has since transferred to another position associated with node B of organizational structure 210 of FIG. 2. In this position, another context key ("456") is assigned to Charlie by context engine 790 and is stored in security table 600 of FIG. 6. Anytime in February (or anytime that key 456 remains without an end date in field 606), Charlie will be limited to access only transactional information that was generated by Sam and having a context key TUV associated with that information. Effectively, Charlie is denied access to Marc's February information, such as the sales revenue store in record 716 of FIG. 7.

Figure 8:
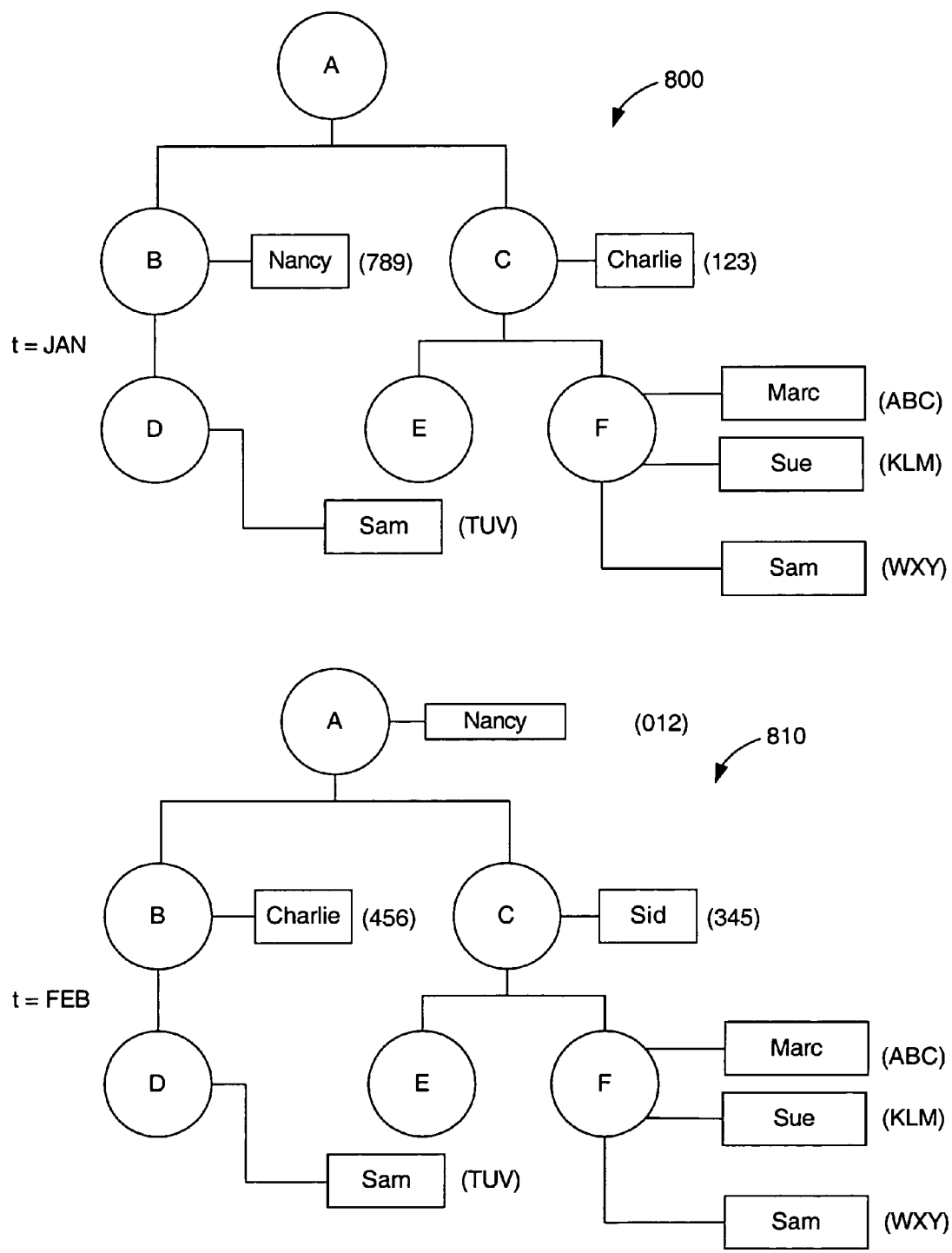
FIG. 8 depicts an exemplary hierarchical tree data structure at two periods of time in accordance with at least one specific embodiment of the invention.

FIGS. 8-11 illustrate securing and accessing secured information in accordance with yet another embodiment of the present invention. In FIG. 8, organizational structures 800 and 810 are similar to that of organizational structures 200 and 210 of FIG. 2, respectively. In organizational structure 800, Nancy is associated with a supervisory role linked to node B (with context key 789) and sales person Sam now is also associated with subordinate node F (with context key WXY). Given organizational structure 800, context engine 790 of FIG. 7 generates context table 900 of FIG. 9 with two records 960 and 962, which have not been shown previously in context table 400 of FIG. 4.

Next consider that Nancy is promoted and assumes a position associated with node A, Charlie replaces her, and a new employee, Sid, assumes Charlie's old position associated with node C, as shown in organizational structure 810 effective February 1st. Given organizational structure 810, context engine 790 of FIG. 7 generates context table 1000 of FIG. 10 with three records 1050, 1052 and 1054, which were not shown previously in context table 500 of FIG. 5. As shown in FIG. 10, Charlie's context key 123 and Nancy's context key 789 are now associated with "closed" time periods. That is, the end date field 416 includes a fixed date (i.e., "JAN 31") rather that a "P," which signifies that the associated context is valid for the position that the person assumes. Further, the "P" indicates that the context keys in records 1050, 1052, and 1054 are valid for the "present" organizational structure 810.

Figure 11:
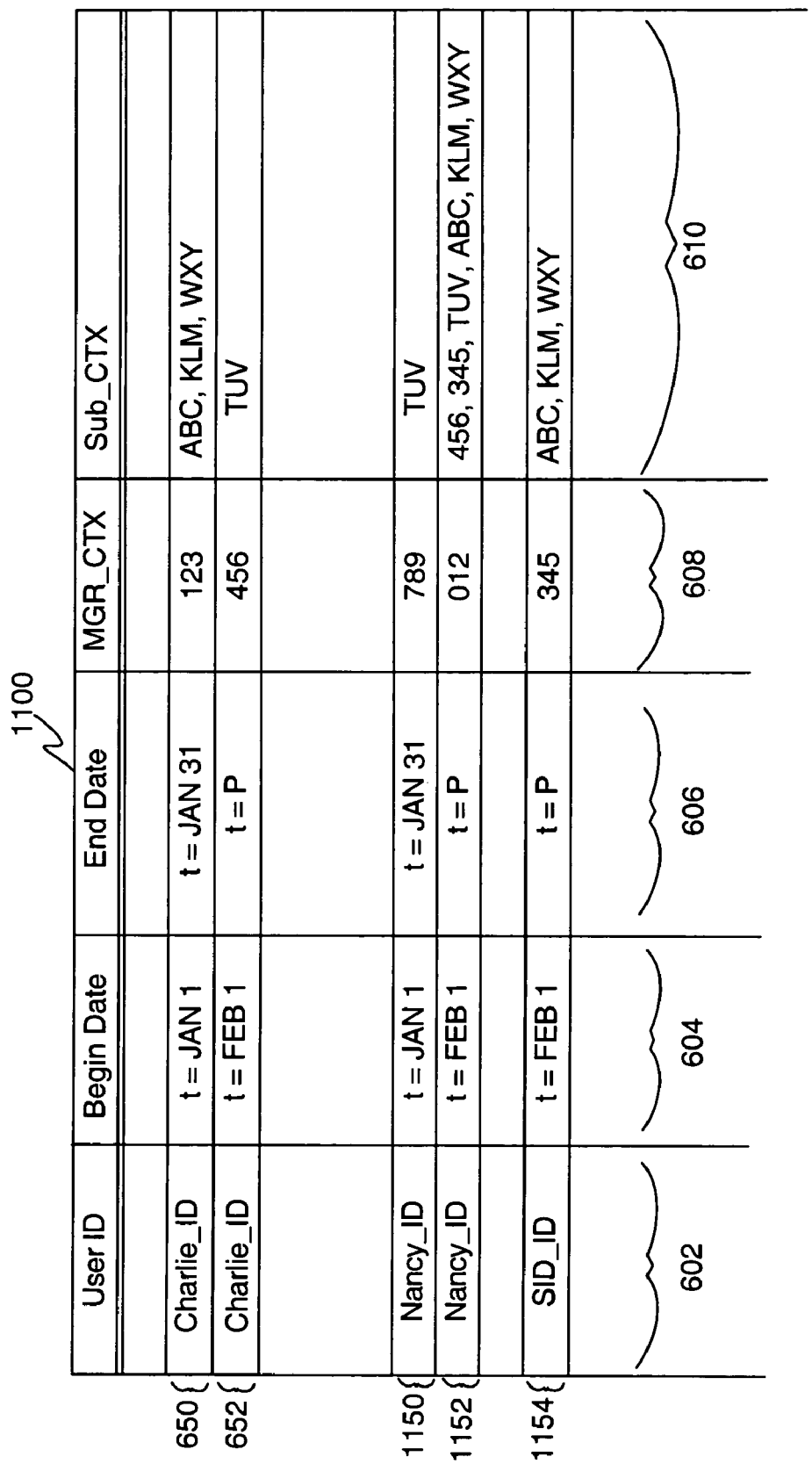
FIG. 11 illustrates an exemplary security table, according to various embodiments of the present invention.

FIG. 11 depicts an exemplary security table 1100 generated by security engine 792 of FIG. 7, according to another specific embodiment of the present invention. Given organizational structure 810, security table 1100 of FIG. 11 includes three records 1150, 1152 and 1154, which have not been shown previously in security table 600 of FIG. 6. As shown in FIG. 11, Nancy's security definition allows her to access everyone's information during the month of February (i.e., new context key 012 permits her to view transactional information associated with each of the following context keys: 456, 345, TUV, ABC, KLM, WXY). Further, FIG. 11 shows that in each organizational structure, Sam generates information that is associated with one of either two nodes D or F. Hence, in organizational structure 810 and for the month of February to the present, Charlie can access Sam's information, but only that information associated with context key TUV, whereas Sid can also access Sam's information, but only that information associated with context key WXY.

In yet another embodiment of the present invention, accessed information is presented to the user as graphical information, such as a representation of an organization hierarchical organizational structure 200 illustrated in FIG. 2. For example, consider that Charlie wishes to view persons of the sales teams associated with nodes E and F, but the user interface returns a graphical representation of a tree displaying only nodes A, B and C. If Charlie is requesting this information in January, context table 400 of FIG. 4 indicates that his context key 123 includes attributes allowing Charlie to access that graphical information. That is, "node security permissions to access child node" field 412 includes a "Y" attribute for yes. Consequently, application server 710 of FIG. 7 will present to Charlie an expanded graphical representation of the tree structure to include nodes E and F, as shown in organizational structure 200 of FIG. 2.

Further to this example, "node security permissions to access sibling node" field 410 of FIG. 4 includes a "Y" attribute, which allows Charlie having a context key 123 to view the sales teams associated with node B (including node D) and other sibling nodes. Hence, application server 710 of FIG. 7 will present to Charlie an expanded graphical representation of the tree structure to include node D, as shown in organizational structure 200 of FIG. 2. In this example, however, security table 600 prevents Charlie from gaining access to information generated by those sibling nodes (such as node D).

Consider next that Charlie requests this information in February, where context table 500 of FIG. 5 indicates that his context key 456 includes attributes allowing Charlie to access that graphical information. That is, node security permissions to access sibling node field 410 for FIG. 5 includes a "Y" attribute for yes. Consequently, Charlie's context key 456 allows him to view the sales teams associated with node E and F, even though he is associated with node B in February. In particular, application server 710 will present to him a graphical representation of a hierarchical tree showing the expanded view of the nodes E and F, including the associated sales team members. But, with Charlie's context key 456, he is precluded from inspecting information generated by sales persons linked to nodes E and F.

Although the present invention is discussed above with respect to specific embodiments, one of ordinary skill in the art will recognize that these embodiments are merely illustrative, and not restrictive of the present invention. Further, modifications and variations of these embodiments are covered by the above teachings and are within the scope of the appended claims without departing from the spirit and intended scope thereof. For example, although the above describes a system and a method for securing transactional information, it should be understood that the present invention relates to securing and accessing secured information in general and need not be restricted to transactional information, but could include accessing information containing employee performance evaluations and any other confidential or restricted information. The scope of the invention is to be determined by the appended claims.

We claim:

1. A method for securing information within a computing system, the method comprising:
    identifying, using an applications server computer, a first entity associated with data representing at least a portion of transactional information;
    retrieving, with the applications server computer, a first context associated with the first entity from a context table database, the first context having a first valid time period, the first context identifying a first subset of the at least a portion of transactional information that was generated during the first valid time period;
    identifying, with the applications server computer, a second entity having a relationship to the first entity;
    retrieving, with the applications server computer, a second context associated with the second entity from the context table database, the second context having a second valid time period, the second valid time period identifying a period of time the relationship is effective;
    determining, with the applications server computer, a second subset of the first subset, the second subset identifying the at least a portion of transactional information that was generated during the second valid time period;
    authorizing, with the applications server computer, access by the second entity to the second subset of data at any point in time, independent of the first valid time period or second valid time period;
    authorizing, with the applications server computer, access by the second entity to the first subset of data during the second valid time period; and
    denying, with the applications server computer, access to portions of the first subset of data that are not included in the second subset of data during periods outside of the second valid time period.

2. The method of claim 1 further comprising denying access to another subset of data generated other than during the relationship.

3. The method of claim 1 wherein the relationship is represented by a portion of a hierarchical data structure.

4. The method of claim 1 wherein the first entity and the second entity are identified as having a first role and a second role, respectively.

5. A method for securing information within a computing system, the method comprising:
    identifying a first entity associated with data representing at least a portion of transactional information;
    retrieving a first context associated with the first entity from a context table database, the first context having a first valid time period, the first context identifying a first subset of the at least a portion of transactional information that was generated during the first valid time period;
    identifying a second entity having a relationship to the first entity;
    retrieving a second context associated with the second entity from the context table database, the second context having a second valid time period, the second valid time period identifying a period of time the relationship is effective;
    determining a second subset of the first subset, the second subset identifying the at least a portion of transactional information that was generated during the second valid time period; and
    authorizing access by the second entity to the second subset of data at any point in time, independent of the first valid time period or second valid time period,
    wherein the first entity and the second entity are identified as having a first role and a second role, respectively, wherein the relationship is defined at least by the first role and the second role.

6. The method of claim 1 wherein the relationship is such that the second entity receives compensation based upon a transaction performed by the first entity.

7. The method of claim 6 wherein the transaction is a sale.

8. The method of claim 6 wherein the first entity and the second entity are further identified as participants in a compensation plan.

9. A method for accessing a secured computer system by a user, the method comprising:
    accepting via a user interface at least one input signal representing a user identifier associated with the user;
    accepting via the user interface at least another input signal representing a point in time;
    retrieving a first context from a context table database, the first context associated with the user identifier at the point in time;
    identifying one or more subsets of data associated with the first context, each subset of data representing at least a portion of transactional information; and
    providing to the user the one or more subsets of data at another point in time unrelated to the point in time.

10. The method of claim 9 wherein the one or more subsets of data are associated with a period of time including the point in time.

11. The method of claim 10 wherein the another point in time is outside the period of time.

12. The method of claim 9 wherein the transactional information includes information generated from a sale.

13. The method of claim 9 further comprising:
    identifying one or more other subsets of data associated with neither the point in time nor the user identifier; and
    denying access to one or more other subsets of data.

14. The method of claim 9 wherein identifying one or more subsets of data comprises:
    associating an entity context to the portion of the transactional information;
    associating a user context to the entity context; and
    selecting the one or more subsets of data associated with the user context and the point in time.

15. The method of claim 9 wherein the entity context is defined in part by a first entity characteristic, which is an association to a first node of a hierarchical tree data structure.

16. The method of claim 15 wherein the first node is a child node.

17. The method of claim 15 wherein the context is further defined by a second entity characteristic, which is a name of a first person recognized for transacting the sale.

18. The method of claim 17 wherein the context is further defined by a third entity characteristic, which is a compensation plan identifier for determining the distribution of proceeds from the transaction.

19. The method of claim 14 wherein the user context is defined in part by a first user characteristic, which is an association to a second node of a hierarchical tree data structure.

20. The method of claim 19 wherein the second node is a parent node, where the parent node is authorized to access transactional information relating to the child node.

21. The method of claim 19 wherein the context is further defined by a second user characteristic, which is a name of a second person associated with the user identifier.

22. The method of claim 21 wherein the context is further defined by a third user characteristic, which is the compensation plan identifier for determining an amount of proceeds received from the transaction.

23. The method of claim 9 wherein the user interface is a graphical user interface.

24. The method of claim 23 wherein providing to the user the one or more subsets of data further comprises:
- displaying a graphical representation of a hierarchical tree data structure to the user, the hierarchical tree data structure including a number of interrelated nodes including at least one parent node and at least one child node related to the one parent node;
- selecting at the another point in time the one parent node for displaying further additional nodes not displayed with the graphical representation;
- displaying the additional nodes if the user is authorized to access the one child node during a period of time including the point in time; and
- denying display of the additional nodes if the user is not authorized to access the one child node during another period of time excluding the point in time.

25. A system for securing information comprising:
- means for identifying a first entity associated with data representing at least a portion of transactional information;
- means for retrieving a first context associated with the first entity from a context table database, the first context having a first valid time period, the first context identifying a first subset of the at least a portion of transactional information that was generated during the first valid time period;
- means for identifying a second entity having a relationship to the first entity;
- means for retrieving a second context associated with the second entity from the context table database, the second context having a second valid time period, the second valid time period identifying a period of time the relationship is effective;
- means for determining a second subset of the first subset, the second subset identifying the at least a portion of transactional information that was generated during the second valid time period; and
- means for authorizing access by the second entity to the second subset of data at any point in time, independent of the first valid time period or second valid time period.

26. An apparatus for securing information comprising:
- a server system configured for identifying a first entity associated with data representing at least a portion of transactional information;
- the server system further configured for retrieving a first context associated with the first entity from a context table database, the first context having a first valid time period, the first context identifying a first subset of the at least a portion of transactional information that was generated during the first valid time period;
- the server system further configured for identifying a second entity having a relationship to the first entity;
- the server system further configured for retrieving a second context associated with the second entity from the context table database, the second context having a second valid time period, the second valid time period identifying a period of time the relationship is effective;
- the server system further configured for determining a second subset of the first subset, the second subset identifying the at least a portion of transactional information that was generated during the second valid time period; and
- the server system further configured for authorizing access by the second entity to the second subset of data at any point in time, independent of the first valid time period or second valid time period;
- the server system further configured for authorizing access by the second entity to the first subset of data during the second valid time period; and
- the server system further configured for denying access to portions of the first subset of data that are not included in the second subset of data during periods outside of the second valid time period.

27. A non-transitory computer readable medium containing programming code which when executed by a computing system causes the computing system to:
- identify a first entity associated with data representing at least a portion of transactional information;
- retrieve a first context associated with the first entity from a context table database, the first context having a first valid time period, the first context identifying a first subset of the at least a portion of transactional information that was generated during the first valid time period;
- identify a second entity having a relationship to the first entity;
- retrieve a second context associated with the second entity from the context table database, the second context having a second valid time period, the second valid time period identifying a period of time the relationship is effective;
- determine a second subset of the first subset, the second subset identifying the at least a portion of transactional information that was generated during the second valid time period; and
- authorize access by the second entity to the second subset of data at any point in time, independent of the first valid time period or second valid time period;
- authorize access by the second entity to the first subset of data during the second valid time period; and
- deny access to portions of the first subset of data that are not included in the second subset of data during periods outside of the second valid time period.

28. A non-transitory computer readable medium containing programming code which when executed by a computing system causes the computing system to:
- accept via a user interface at least one input signal representing a user identifier associated with the user;
- accept via a user interface at least another input signal representing a point in time;
- identify one or more subsets of data associated with both the point in time and the user identifier, each subset of data representing at least a portion of transactional information; and
- provide to the user the one or more subsets of data at another point in time unrelated to the one or more subsets; and
- deny the user access to transactional information that is not associated with the user identifier or the point in time.

* * * * *